(12) United States Patent
Chavan et al.

(10) Patent No.: US 11,132,200 B1
(45) Date of Patent: Sep. 28, 2021

(54) LOOP END PREDICTION USING LOOP COUNTER UPDATED BY INFLIGHT LOOP END INSTRUCTIONS

(71) Applicant: Arm Limited, Cambridge (GB)

(72) Inventors: Vijay Chavan, Tempe, AZ (US); Kim Richard Schuttenberg, Gilbert, AZ (US); Rong Zhang, Chandler, AZ (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/034,519

(22) Filed: Sep. 28, 2020

(51) Int. Cl.
*G06F 9/32* (2018.01)
*G06F 9/30* (2018.01)
*G06F 9/38* (2018.01)

(52) U.S. Cl.
CPC .......... *G06F 9/325* (2013.01); *G06F 9/30065* (2013.01); *G06F 9/381* (2013.01); *G06F 9/3806* (2013.01)

(58) Field of Classification Search
CPC .............................. G06F 9/30065; G06F 9/325
See application file for complete search history.

(56) References Cited

U.S. PATENT DOCUMENTS

| | | | | |
|---|---|---|---|---|
| 2016/0092230 A1* | 3/2016 | Chen | ................... | G06F 9/30065 712/241 |
| 2016/0132331 A1* | 5/2016 | Godard | ................. | G06F 9/3806 711/137 |
| 2020/0409703 A1* | 12/2020 | An | ....................... | G06F 9/30065 |

OTHER PUBLICATIONS

Sherwood et al., "Loop Termination Prediction", In Proceedings of the 3$^{rd}$ International Symposium on High Performance Computing (ISHPC2K), Oct. 2000, 14 pages.

* cited by examiner

*Primary Examiner* — Jyoti Mehta
(74) *Attorney, Agent, or Firm* — Nixon & Vanderhye P.C.

(57) ABSTRACT

In a data processing apparatus loop end prediction is carried out to predict whether a branch represented by a loop end instruction will be taken, branching to the start of the loop for a further iteration to be carried out, or will be not taken leading to the further instructions following the loop. A loop iteration counter at the fetch stage of the apparatus maintains a count on the basis of which the prediction is made. The loop iteration counter is decremented both by loop end instructions reaching the end of the pipeline for which no prediction was made and by later loop end instructions for which a prediction is made, once it has been established that a loop is being executed. This dual counting mechanism allows "shadow" loop end instructions, which were already in the pipeline by the time it was established that a loop is being executed, to be accounted for.

19 Claims, 8 Drawing Sheets

LOOP END PREDICTION USING LOOP COUNTER UPDATED BY INFLIGHT LOOP END INSTRUCTIONS

TECHNICAL FIELD

The present disclosure relates to data processing. In particular, the present disclosure relates to data processing involving loops in program code.

DESCRIPTION

A data processing apparatus which executes data processing instructions may be programmed using loop instructions, for example when a given portion of program code needs to be executed for multiple iterations. Indeed many computer applications are dominated by repetitive tasks that are represented by loops in the hardware assembly code. Conditional branch instructions are often used to implement loops in the hardware. However there is performance loss due to branch handling overheads and hence some architectures comprise low overhead loop instructions which provide the hardware with the expected loop count, such that all iterations of the loop can be correctly predicted. A loop buffer may be implemented to increase performance which acts as a cache for instructions being executed in the loop, eliminating the need to fetch the leap instructions repeatedly through the loop. Nevertheless a challenge remains to accurately predict all of the loop iterations, without requiring expensive hardware in support of that aim.

SUMMARY

In one example embodiment described herein there is an apparatus comprising:
processing circuitry to execute instructions defining data processing operations; and
fetch circuitry to retrieve a sequence of instructions for execution by the processing circuitry,
wherein the sequence of instructions comprises a loop start instruction and a loop end instruction delimiting a loop body portion of the sequence of instructions,
wherein the fetch circuitry comprises a loop counter arranged to indicate a remaining number of iterations for which the loop body portion is to be executed and a loop validity indicator, wherein the processing circuitry is responsive to execution of a first instance of the loop end instruction to set the loop validity indicator,
wherein the fetch circuitry comprises loop end prediction circuitry responsive to the loop end instruction in the sequence of instructions, when the loop validity indicator is set, to generate in dependence on the loop counter an associated branch prediction for the loop end instruction of either:
  a taken branch prediction, leading to a first instruction of the loop body portion; or
  a not-taken branch prediction, leading to a next instruction sequentially following the loop end instruction in the sequence of instructions,
wherein the loop end prediction circuitry is responsive to the loop counter indicating a non-zero remaining number of iterations to generate the taken branch prediction and to decrement the loop counter,
wherein the loop end prediction circuitry is responsive to the loop counter indicating zero remaining iterations to generate the not-taken branch prediction, and
wherein the processing circuitry is responsive to execution of the loop end instruction, when the loop end instruction does not have the associated prediction, to signal to the loop end prediction circuitry to decrement the loop counter.

In one example embodiment described herein there is a method of data processing comprising:
fetching using fetch circuitry a sequence of instructions for execution by processing circuitry, wherein the sequence of instructions comprises a loop start instruction and a loop end instruction delimiting a loop body portion of the sequence of instructions;
maintaining in the fetch circuitry a loop counter arranged to indicate a remaining number of iterations for which the loop body portion is to be executed and a loop validity indicator;
setting the loop validity indicator in response to execution by the processing circuitry of a first instance of the loop end instruction;
generating in the fetch circuitry in dependence on the loop counter an associated branch prediction for the loop end instruction when the loop validity indicator is set, wherein the associated branch prediction is either:
  a taken branch prediction, leading to a first instruction of the loop body portion; or
  a not-taken branch prediction, leading to a next instruction sequentially following the loop end instruction in the sequence of instructions;
in response to the loop counter indicating a non-zero remaining number of iterations, generating the taken branch prediction and decrementing the loop counter;
in response to the loop counter indicating zero remaining iterations generating the not-taken branch prediction; and
in response to execution of the loop end instruction, when the loop end instruction does not have the associated prediction, decrementing the loop counter.

In one example embodiment described herein there is an apparatus comprising:
means for fetching a sequence of instructions, wherein the sequence of instructions comprises a loop start instruction and a loop end instruction delimiting a loop body portion of the sequence of instructions;
means for execution of the sequence of instructions;
means for maintaining a loop counter in the means for fetching, wherein the loop counter is arranged to indicate a remaining number of iterations for which the loop body portion is to be executed and a loop validity indicator;
means for setting the loop validity indicator in response to execution by the means for execution of a first instance of the loop end instruction;
means for generating in dependence on the loop counter in the means for fetching an associated branch prediction for the loop end instruction when the loop validity indicator is set, wherein the associated branch prediction is either:
  a taken branch prediction, leading to a first instruction of the loop body portion; or
  a not-taken branch prediction, leading to a next instruction sequentially following the loop end instruction in the sequence of instructions;
means for generating the taken branch prediction and decrementing the loop counter in response to the loop counter indicating a non-zero remaining number of iterations;
means for generating the not-taken branch prediction in response to the loop counter indicating zero remaining iterations; and means for decrementing the loop counter in response to execution of the loop end instruction, when the loop end instruction does not have the associated prediction.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
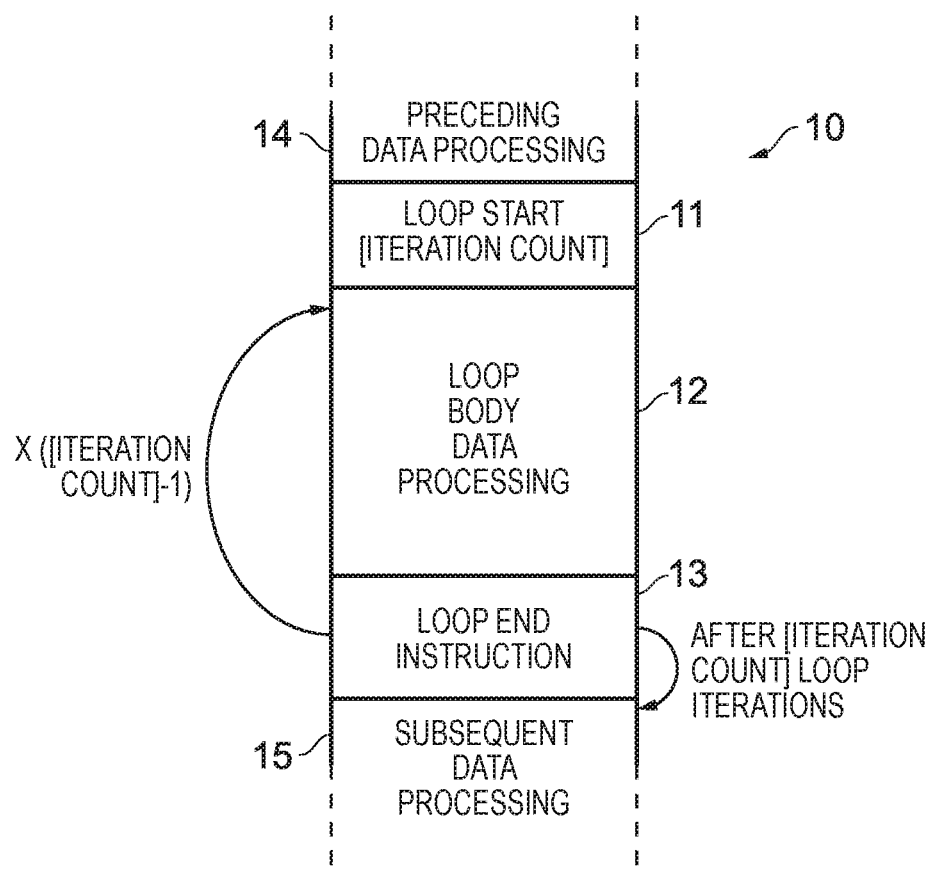
FIG. 1 illustrates a sequence of instructions to be executed by processing circuitry, where the sequence comprises a loop start instruction and a loop end instruction delimiting a loop body portion of the sequence of instructions.

Before discussing the embodiments with reference to the accompanying figures, the following description of embodiments is provided.

In accordance with one example configuration there is provided an apparatus comprising:

processing circuitry to execute instructions defining data processing operations; and fetch circuitry to retrieve a sequence of instructions for execution by the processing circuitry, wherein the sequence of instructions comprises a loop start instruction and a loop end instruction delimiting a loop body portion of the sequence of instructions, wherein the fetch circuitry comprises a loop counter arranged to indicate a remaining number of iterations for which the loop body portion is to be executed and a loop validity indicator, wherein the processing circuitry is responsive to execution of a first instance of the loop end instruction to set the loop validity indicator, wherein the fetch circuitry comprises loop end prediction circuitry responsive to the loop end instruction in the sequence of instructions, when the loop validity indicator is set, to generate in dependence on the loop counter an associated branch prediction for the loop end instruction of either:

a taken branch prediction, leading to a first instruction of the loop body portion; or a not-taken branch prediction, leading to a next instruction sequentially following the loop end instruction in the sequence of instructions, wherein the loop end prediction circuitry is responsive to the loop counter indicating a non-zero remaining number of iterations to generate the taken branch prediction and to decrement the loop counter, wherein the loop end prediction circuitry is responsive to the loop counter indicating zero remaining iterations to generate the not-taken branch prediction, and wherein the processing circuitry is responsive to execution of the loop end instruction, when the loop end instruction does not have the associated prediction, to signal to the loop end prediction circuitry to decrement the loop counter.

The present techniques recognise that the loop iteration count for which a defined loop of program instructions (i.e. the loop body portion of the sequence of instructions) is to be executed does not become available to the apparatus until the first loop end instruction is executed in the processing circuitry. However in a data processing apparatus which operates in a pipelined fashion, there is then a possibility for many loop end instructions to already be in flight in the apparatus (i.e. at some intermediate stage of the pipeline between fetch and retirement) by the time the first loop end instruction handled for a given program loop is itself executed and retired. Such loop end instructions are referred to as "shadow" loop end instructions herein. In this context the present techniques propose loop end prediction circuitry in the fetch circuitry which provides a branch prediction for loop end instructions of either "taken", i.e. branching to the first instruction of the loop body portion, or "not taken", i.e. following on to the next instruction sequentially following the loop end instruction in the sequence of instructions. In particular the present techniques propose that the loop end prediction circuitry comprises a loop counter used to keep track of how many further iterations of the loop are to be iterated and that a "dual counting" mechanism is implemented, wherein an update to the loop counter is triggered by two events. The first is the prediction of a loop end instruction by the loop end predictor in the fetch circuitry and the second is the retiring of a "shadow" loop end instruction in the processing circuitry. This mechanism allows the apparatus to take into account the shadow loop end instructions, in addition to those loop end instructions encountered by the fetch circuitry after the first loop end instruction has been executed, such that correct predictions (of taken) can be made for all iterations of the loop other than the final iteration and a correct prediction (of not taken) can be made for the final iteration of the loop.

It is further proposed that the updating of the loop counter may be made dependent on the number of iterations remaining for the loop being executed and in particular that the updating of the loop counter may be suppressed when the remaining loop iteration count is greater than a defined maximum count value. Accordingly in some embodiments the fetch circuitry further comprises a saturated counter indicator, wherein the processing circuitry is responsive to the loop end instruction, when a remaining loop iteration count is greater than a defined maximum count value to set the saturated counter indicator, wherein the loop end prediction circuitry is responsive to the saturated counter indicator being set to generate the taken branch prediction without decrementing the loop counter.

This approach to the updating of the loop counter may be variously configured, but in some embodiments the defined maximum count value is a maximum value that the loop counter can indicate. This enables a finite size of loop counter to be implemented without imposing a limit on the number of loop iteration which can be handled.

For example, in some embodiments the defined maximum count value is a maximum number of loop end instructions that can be contemporaneously in-flight in the apparatus. Accordingly the loop counter is configured to handle all of the "shadow" loop end instructions which can exist in the apparatus, but does not need to take up more space (by the provision of a larger counter) than is required for this purpose.

In some embodiments the processing circuitry is responsive to the loop end instruction, when the remaining loop iteration count is not greater than the defined maximum count value to unset the saturated counter indicator. Thus the saturated counter indicator can be used to suppress the updating of the counter, until the remaining number of iterations is within the range of the counter.

In some embodiments the processing circuitry is responsive to the loop end instruction, when the remaining loop iteration count is not greater than the defined maximum count value to copy the remaining loop iteration count into the loop counter in the fetch circuitry. Thus, when the remaining iteration count is within the range loop counter, which could be the case when the first loop end instructions encountered, or may not occur (for loops with greater iteration counts) until the loop has already been executed by a number of iterations.

The loop end instructions which the loop end prediction circuitry handles and in particular for which it generates an associated branch prediction may be identified in a variety of ways, but in some embodiments the apparatus further comprises decode circuitry following the fetch circuitry and preceding the processing circuitry, wherein the decode circuitry is responsive to the loop end instruction, when the loop end prediction circuitry has generated the associated branch prediction for the loop end instruction, to set a loop end prediction flag associated with the loop end instruction.

Such a loop end prediction flag can then be made use of by the processing circuitry when executing the loop end instruction and in some embodiments the processing circuitry is responsive to the loop end instruction, when the loop end prediction flag is not set, to signal to the loop end prediction circuitry to decrement the loop counter.

In some embodiments the apparatus further comprises branch prediction circuitry to generate branch predictions for instructions in the sequence of instructions, wherein the processing circuitry is arranged to use a branch prediction for the loop end instruction generated by the branch prediction circuitry, when the loop end instruction does not have the associated prediction.

In some embodiments the apparatus further comprises branch resolution circuitry responsive to a branch misprediction to cause a reset of the loop counter and the loop end prediction circuitry. Thus when a branch within a loop being "loop end" predicted by the apparatus is mispredicted the content of the loop end prediction circuitry (both at the fetch front end and at the retirement back end) can be cleared (in addition to the usual flush of the pipeline triggered by the misprediction) and the loop end predictor can be re-trained as if it were see the loop for the first time.

In accordance with one example configuration there is provided a method of data processing comprising:

fetching using fetch circuitry a sequence of instructions for execution by processing circuitry, wherein the sequence of instructions comprises a loop start instruction and a loop end instruction delimiting a loop body portion of the sequence of instructions;

maintaining in the fetch circuitry a loop counter arranged to indicate a remaining number of iterations for which the loop body portion is to be executed and a loop validity indicator;

setting the loop validity indicator in response to execution by the processing circuitry of a first instance of the loop end instruction;

generating in the fetch circuitry in dependence on the loop counter an associated branch prediction for the loop end instruction when the loop validity indicator is set, wherein the associated branch prediction is either:

a taken branch prediction, leading to a first instruction of the loop body portion; or a not-taken branch prediction, leading to a next instruction sequentially following the loop end instruction in the sequence of instructions;

in response to the loop counter indicating a non-zero remaining number of iterations, generating the taken branch prediction and decrementing the loop counter;

in response to the loop counter indicating zero remaining iterations generating the not-taken branch prediction; and in response to execution of the loop end instruction, when the loop end instruction does not have the associated prediction, decrementing the loop counter.

In accordance with one example configuration there is provided an apparatus comprising:

means for fetching a sequence of instructions, wherein the sequence of instructions comprises a loop start instruction and a loop end instruction delimiting a loop body portion of the sequence of instructions;

means for execution of the sequence of instructions;

means for maintaining a loop counter in the means for fetching, wherein the loop counter is arranged to indicate a remaining number of iterations for which the loop body portion is to be executed and a loop validity indicator;

means for setting the loop validity indicator in response to execution by the means for execution of a first instance of the loop end instruction;

means for generating in dependence on the loop counter in the means for fetching an associated branch prediction for the loop end instruction when the loop validity indicator is set, wherein the associated branch prediction is either:

a taken branch prediction, leading to a first instruction of the loop body portion; or a not-taken branch prediction, leading to a next instruction sequentially following the loop end instruction in the sequence of instructions;

means for generating the taken branch prediction and decrementing the loop counter in response to the loop counter indicating a non-zero remaining number of iterations;

means for generating the not-taken branch prediction in response to the loop counter indicating zero remaining iterations; and means for decrementing the loop counter in response to execution of the loop end instruction, when the loop end instruction does not have the associated prediction.

Particular embodiments will now be described with reference to the figures.

FIG. 1 represents a sequence of instructions 10, which in particular comprises a loop start instruction 11, a block of instructions 12 forming the loop body, and a loop end instruction 13. These instructions are shown to be preceded by various data processing instructions 14 and followed by various data processing instructions 15. Accordingly following the preceding data processing 14, the loop start instruction 11 is followed by the loop body data processing 12.

Then, depending on the number of iterations which have been completed the loop end instruction 13 either resolves as a "taken" branch leading back to the beginning of the loop body data processing 12 or resolves as a "not taken" branch and the subsequent data processing 15 following loop end instruction 13 is then carried out. The number of iterations for which the loop is to be executed is passed to the loop start instruction 11 and the loop end instruction 13 tracks the iteration count and resolves into "not taken" on the last iteration. In other words, the loop end instruction 13 behaves as a conditional branch instruction, where the condition is a remaining iterations value, and the conditional branch instruction resolves as taken for a non-zero value and as not-taken for a value of zero.

Figure 2:
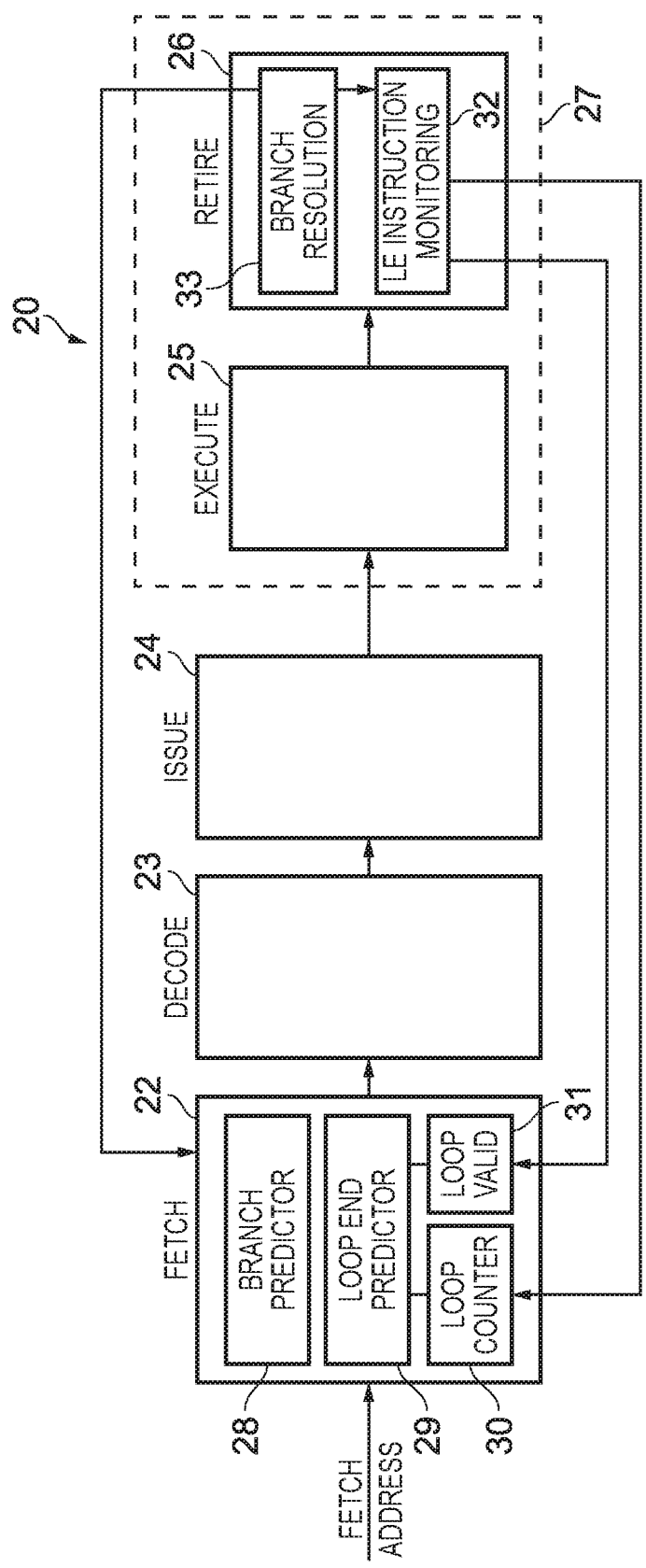
FIG. 2 schematically illustrates an apparatus according to some embodiments.

FIG. 2 schematically illustrates an apparatus 20 which is arranged, in a manner with which one of ordinary skill in the art will be familiar, as a sequence of pipeline stages. In the representation of FIG. 2 these stages are shown to be a fetch stage 22, a decode stage 23, an issue stage 24, an execute stage 25, and retire stage 26. Respective circuitry, the detail of which is omitted here for clarity and brevity, provides each of these stages. Together the execute stage 25 and the retire stage 26 may be considered to be processing circuitry 27. In operation the fetch stage 22 fetches instructions which are to be executed by the apparatus and passes these on through the pipeline. In order to provide the execution pipeline with the correct sequence of instructions to execute, the fetch stage 22 monitors the sequence of instructions for branch instructions and its branch predictor 28 provides a prediction for whether a given branch instruction is likely to resolve as taken or not taken. This prediction is based on observation of previous branch outcomes in a manner with which one of ordinary skill in the art will be familiar. Generally such branch predictors can be tuned and trained to provide reliable predictions for the branches which are encountered. However loops, and in particular the completion of the required number of loops, can be more problematic. This is because early iterations are easy for the branch predictor to predict, because the branch back to the start of the loop from the loop end instruction is consistently taken, but the completion of the required number of iterations presents the (historically) unusual behaviour of the loop end instruction branch resolving as not taken.

In order better to be able to predict the behaviour of loops, the apparatus 20 comprises a loop end predictor 29. The loop end predictor 29 comprises a loop counter 30 and a loop valid indicator 31. Whilst the loop valid indicator 31 indicates an invalid status, the loop end predictor 29 does not provide predictions. A first loop end instruction which enters the execution pipeline and is finally executed by the processing circuitry 27 causes the loop valid indicator 31 to be set. In particular, if a loop end instruction reaches the retire stage 26 without an associated loop end predictor generated prediction, and when this this loop end instruction is the first loop end instruction encountered (for the current loop block), this causes the loop end (LE) instruction monitoring circuitry 32 in the retire stage 26 to signal to the loop end predictor 29 to set the loop valid indicator 31 to indicates a valid status. The remaining number of iterations indicated by the loop end instruction are then copied into the loop end predictor's loop counter 30 (and the count is decremented by one). Subsequently when a loop end instruction reaches the retire stage 26 without an associated loop end predictor generated prediction, the loop end instruction monitoring circuitry 32 causes the loop counter 30 to be decremented. Thus this is the mechanism by which "shadow" loop end instructions are accounted for in the loop counter. In parallel, once the loop valid indicator is set to valid, the loop end predictor 29 will generate a branch prediction for the same loop end instructions it encounters on the basis of the remaining number of counts indicated by the loop counter 30. Importantly, note that the loop end predictor 29, when generating a taken prediction for the loop end instruction, will also cause the loop counter to be decremented. Once the loop counter reaches zero the loop end predictor 29 generates a not taken prediction and the valid indicator 31 is reset to indicate invalid. The mechanism is then prepared for the next loop to be encountered in the sequence of instructions. The retire stage 26 is further shown to comprise branch resolution circuitry 33, which indicates to the fetch stage 22 the resolved outcome of branch instructions. A flush of the pipeline is triggered when a misprediction occurs. Additionally, in accordance with the present techniques, the signalling of a branch misprediction taking place whilst the loop end predictor 29 and loop end instruction monitoring circuitry 32 are tracking an active loop also causes a reset of the loop counter end predictor 29, the loop counter 30, and the loop validity indicator 31, as well as of the loop end instruction monitoring circuitry 32. Thus when a branch within a loop being tracked by the apparatus is mispredicted, the content of the loop end prediction circuitry (both at the fetch front end and at the retirement back end) can be cleared (in addition to the usual flush of the pipeline triggered by the misprediction) and the loop end predictor can be re-trained as if it were see the loop for the first time.

Figure 3:
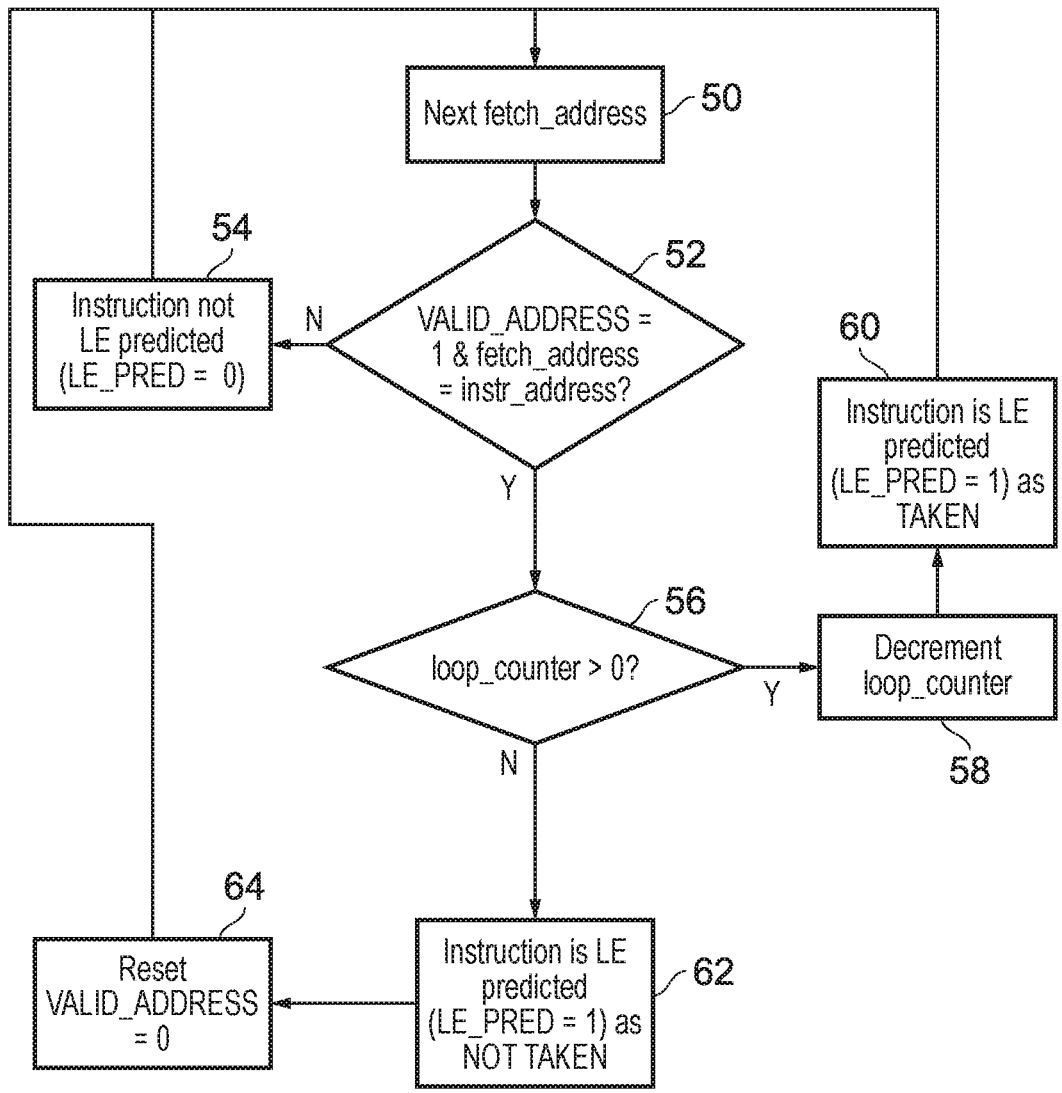
FIG. 3 is a flow diagram showing a sequence of steps which may be carried out by a loop end predictor according to some embodiments.

FIG. 3 is a flow diagram showing a sequence of steps which may be taken by a loop end predictor according to the present techniques. The flow can be considered to begin at step 50 at which the next fetch_address, i.e. the next instruction address fetched, is handled. At step 52 it is then determined if the loop validity indicator VALID_ADDRESS is set and if fetch_address is the loop end instruction (instr_address) currently being handled. When this is not the case the flow proceeds to step 54 and the loop end predictor does not generate a prediction for this instruction (and the instruction is marked as such: LE_PRED=0). If however the condition at step 52 is met then the flow proceeds to step 56 where it is determined if the loop counter in the loop end predictor currently holds a non-zero value. If it does then the flow proceeds to step 58 at which the loop counter is decremented and at step 60 the branch of the loop end instruction is predicted as taken (and the instruction is marked as having been predicted: LE_PRED=1). The flow then returns to step 50. Conversely if at step 56 it is determined that the loop counter in the loop end predictor has reached zero then the flow proceeds to step 62, where the loop end predictor predicts the branch of the loop end instruction as not taken (and instruction is marked as having been predicted: LE_PRED=1). This then being the conclusion of the loop iterations at step 64 VALID_ADDRESS is reset to 0. The flow then returns to step 50.

Figure 4:
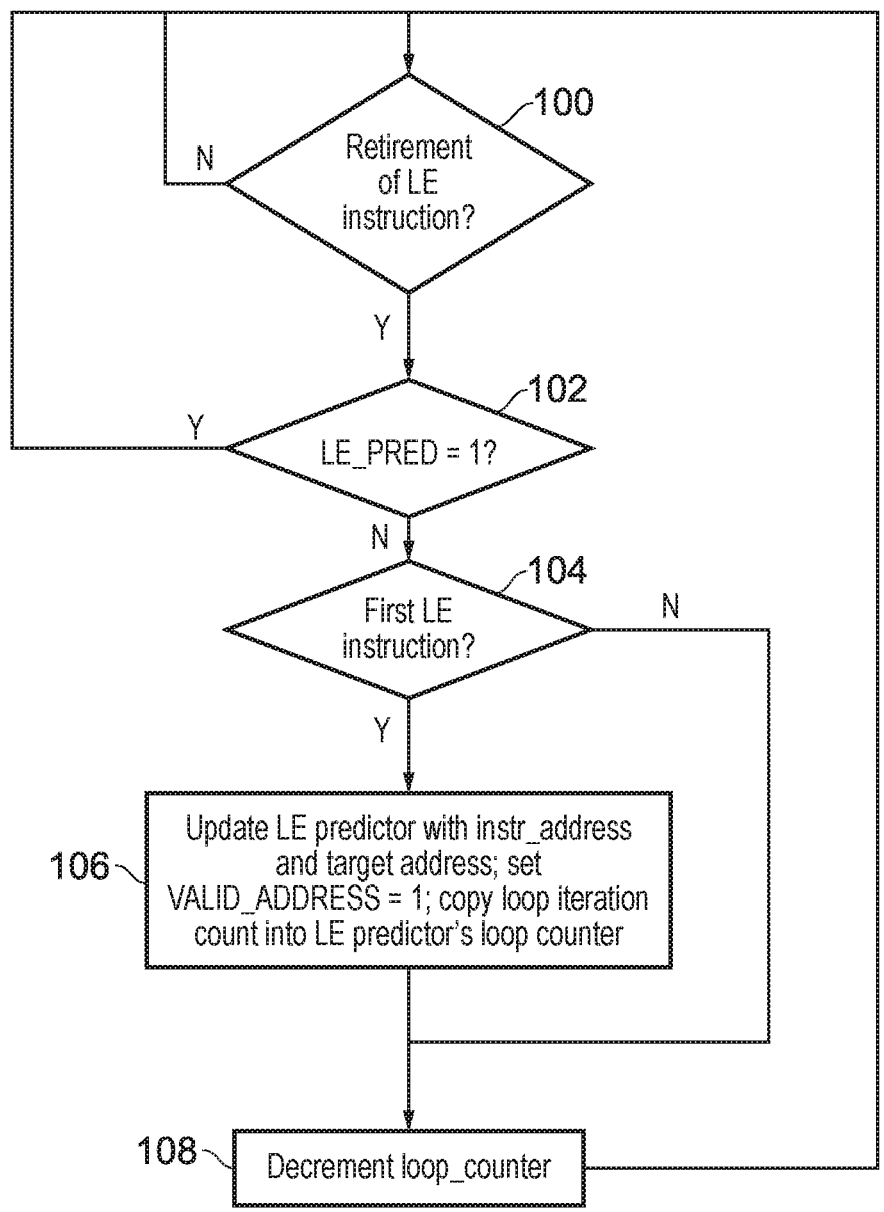
FIG. 4 is a flow diagram showing a sequence of steps which may be carried out by a loop end predictor according to some embodiments.

FIG. 4 is a flow diagram showing a sequence of steps which may be taken by processing circuitry, in particular by loop end instruction monitoring circuitry thereof, according to the present techniques. The flow can be considered to begin at step 100, where it is determined if a loop end (LE) instruction is being retired. The flow loops on itself here until this condition is true. Then at step 102 it is determined if the loop end instruction has had a prediction generated for it by the loop end prediction circuitry. If it has the flow returns to step 100. However if a prediction has not been generated for this loop end instruction by the loop end prediction circuitry then at step 104 it is determined if this is the first loop end instruction encountered. If it is then at step 106 the loop end predictor is updated with the relevant instruction address (of the loop end instruction) and its target address (to use in the loop end predictor's predictions). The the validity indicator VALID_ADDRESS is set and the loop iteration count is copied into the loop end predictor's loop counter. Then at step 108 the loop counter is caused to be decremented and the flow returns to step 100. If however at step 104 it is determined that this is not the first loop end instruction encountered then the flow proceeds directly to 108 for the loop counter to be decremented and the flow then returns to step 100.

Figure 5:
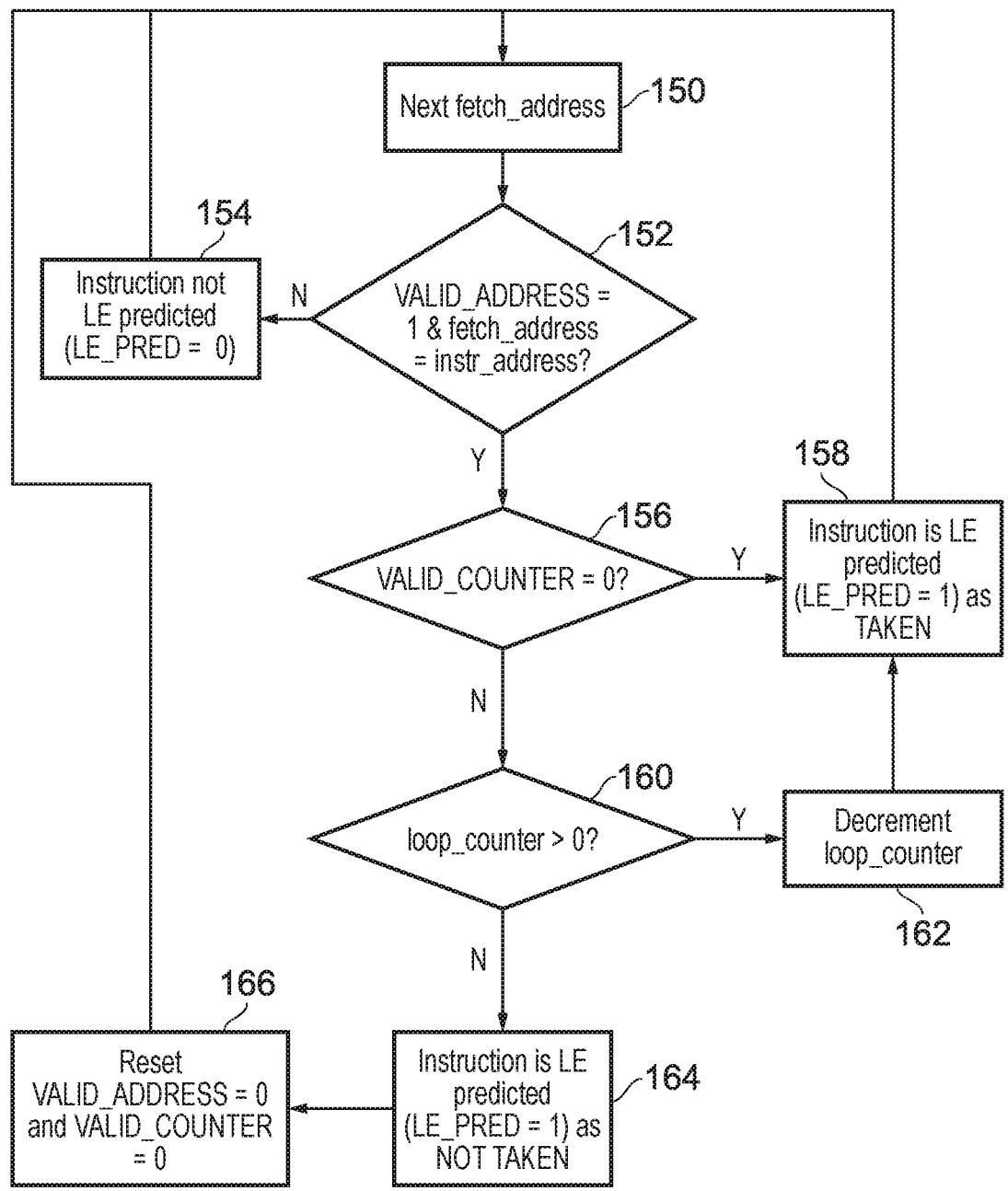
FIG. 5 is a flow diagram showing a sequence of steps which may be carried out by a loop end predictor according to some embodiments.

FIG. 5 is a flow diagram showing a sequence of steps which may be taken by a loop end predictor according to the present techniques, as a variant on the flow diagram of FIG. 3. The flow can be considered to begin at step 150 at which the next fetch_address, i.e. the next instruction address fetched, is handled. At step 152 it is then determined if the loop validity indicator VALID_ADDRESS is set and if fetch_address is the loop end instruction (instr_address) currently being handled. When this is not the case the flow proceeds to step 154 and the loop end predictor does not generate a prediction that this instruction (and the instruction is marked as such: LE_PRED=0). If however the condition at step 152 is met then the flow proceeds to step 156, where it is determined if a valid counter indicator (VALID_COUNTER) is currently set. If it is not, this indicates that the loop counter is not currently active (for example this may be because the remaining number of iterations of the loop is greater than the number which can be held by the loop counter in the loop end predictor) and the flow proceeds to step 158, where the branch of the loop end instruction is predicted as taken (and the instruction is marked as having been predicted: LE_PRED=1). The flow then returns to step 150. Returning to a consideration of step 156, if it is determined that the valid counter indicator (VALID_COUNTER) is currently set, this indicates that the loop counter is active. The flow then proceeds to step 160, where it is determined if the loop counter in the loop end predictor currently holds a non-zero value. If it does then the flow proceeds to step 162 at which the loop counter is decremented and at step 158 the branch of the loop end instruction is predicted as taken (and the instruction is marked as having been predicted: LE_PRED=1). The flow then returns to step 150. Conversely if at step 160 it is determined that the loop counter in the loop end predictor has reached zero then the flow proceeds to step 164, where the loop end predictor predicts the branch of the loop end instruction as not taken (and the instruction is marked as having been predicted: LE_PRED=1). This then being the conclusion of the loop iterations, at step 166 VALID_ADDRESS and VALID_COUNTER are reset to 0. The flow then returns to step 150.

Figure 6:
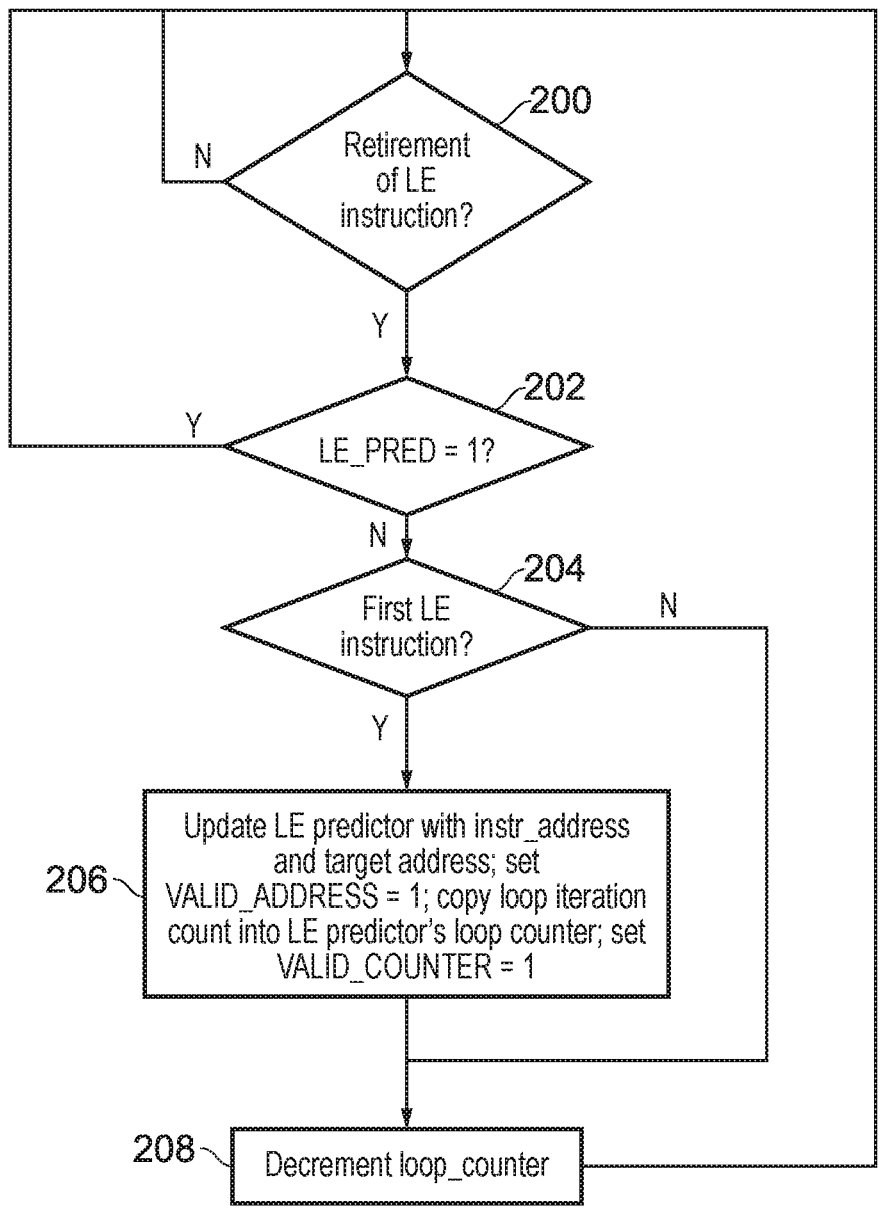
FIG. 6 is a flow diagram showing a sequence of steps which may be carried out by processing circuitry according to some embodiments.

FIG. 6 is a flow diagram showing a sequence of steps which may be taken by processing circuitry, in particular by loop end instruction monitoring circuitry thereof, according to the present techniques in a variant on the flow diagram of FIG. 4. The flow can be considered to begin at step 200 where it is determined if a loop end (LE) instruction is being retired. The flow loops on itself here until this condition is true. Then at step 202 it is determined if the loop end instruction has had a prediction generated for it by the loop end prediction circuitry. If it has the flow returns to step 200. However if a prediction has not been generated for this loop end instruction by the loop end prediction circuitry then at step 204 it is determined if this is the first loop end instruction encountered. If it is then at step 206 the loop end predictor is updated with the relevant instruction address (of the loop end instruction) and its target address (to use in the loop end predictor's predictions). The loop validity indicator VALID_ADDRESS and the counter validity indicator VALID_COUNTER are set. Further, the loop iteration count is copied into the loop end predictor's loop counter. Then at step 208 the loop counter is caused to be decremented and the flow returns to step 200. If however at step 204 it is determined that this is not the first loop end instruction encountered then the flow proceeds directly to step 208 for the loop counter to be decremented and the flow then returns to step 200.

Figure 7:
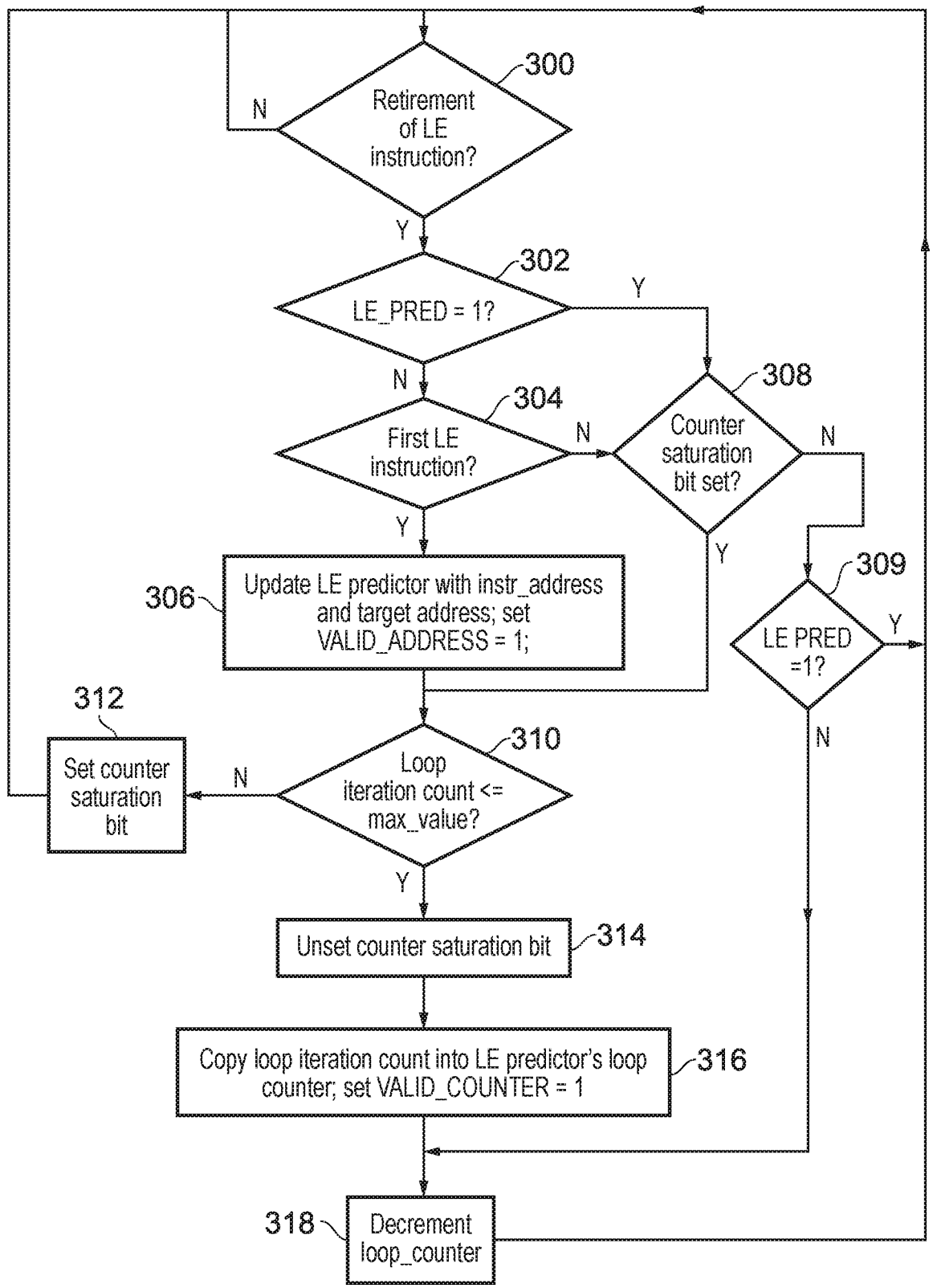
FIG. 7 is a flow diagram showing a sequence of steps which may be carried out by processing circuitry according to some embodiments.

FIG. 7 is a flow diagram showing a sequence of steps which may be taken by processing circuitry, in particular by loop end instruction monitoring circuitry thereof, according to the present techniques in a variant on the flow diagrams of FIGS. 4 and 6. The flow can be considered to begin at step 300 where it is determined if a loop end (LE) instruction is being retired. The flow loops on itself here until this condition is true. Then at step 302 it is determined if the loop end instruction has had a prediction generated for it by the loop end prediction circuitry (LE_PRED=1). If a prediction has not been generated for this loop end instruction by the loop end prediction circuitry (LE_PRED=0), then at step 304 it is determined if this is the first loop end instruction encountered. If it is then at step 306 the loop end predictor is updated with the relevant instruction address (of the loop end instruction) and its target address (to use in the loop end predictor's predictions). The loop validity indicator VALID_ADDRESS is set. If however at step 304 it is determined that this is not the first loop end instruction encountered, then the flow proceeds to step 308, where it is determined if the counter saturation bit is set. This is a bit maintained by the processing circuitry e.g. in the loop end instruction circuitry 32 of FIG. 2. If it is not set then it is determined at step 309 if LE_PRED is set (the loop end instruction has had a prediction generated for it by the loop end prediction circuitry). When LE_PRED is set, the flow returns to step 300. If LE_PRED is not set, the flow proceeds to step 318, where the loop counter in the loop end prediction circuitry is decremented and then the flow returns to step 300. Returning to a consideration of step 302, if LE_PRED=1, i.e. the loop end instruction has had a prediction generated for it by the loop end prediction circuitry, then the flow proceeds to step 308, to test if the counter saturation bit is set. If it is not, then the flow proceeds to step 309, as described above. Following step 306, or as a result of determining that the counter saturation bit is set at step 308, it is then determined at step 310 whether the current loop iteration count (as indicated by the loop end instruction) is less than or equal to the maximum value of the counter. If this is not the case then at step 312 the counter saturation bit is set and the flow returns to step 300. If however at step 310 it is determined that the current iteration count is within the maximum value of the loop counter, then the flow proceeds to step 314 and the counter saturation bit is unset. Then at step 316 the loop iteration count is copied into the loop end predictor's loop counter and the counter validity indicator VALID_COUNTER is set. Then the flow proceeds to step 318, where the loop counter in the loop end prediction circuitry is decremented, and then the flow returns to step 300.

Figure 8:
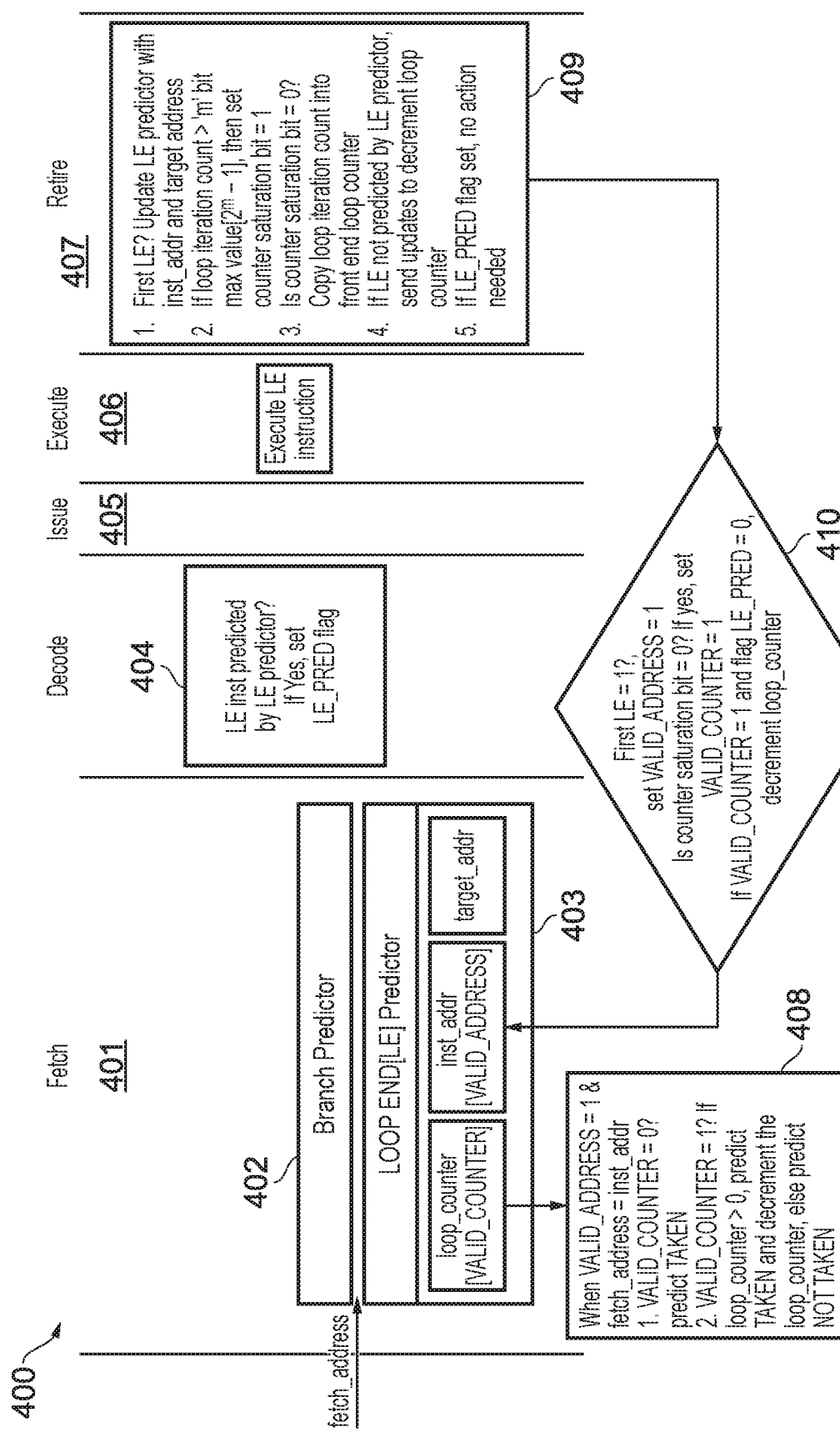
FIG. 8 schematically illustrates the operation of sequential stages of a processing pipeline according to some embodiments.

FIG. 8 schematically illustrates the operation of sequential stages of a processing pipeline 400 according to some embodiments. A fetch stage 401 of the pipeline shown to comprise a branch predictor 402 and a loop end predictor 403. The branch predictor 402 is arranged to generate branch predictions for conditional branch instructions encountered in the sequence of instructions fetched by the fetch stage 401. The loop end predictor 403 is arranged to handle the branch prediction of loop end instructions. In connection with its handling of loop end instructions the loop end predictor 403 maintains a loop counter value (loop_counter), an instruction address (instr_addr), and a target address (target_addr). Further validity bits are held defining the current validity (or not) of the loop counter (VALID_COUNTER) and of the instruction address (VALID_ADDRESS). Following the fetch stage 401 is a decode stage 404 at which a flag in association with a loop end instruction is set when a prediction for the loop end instruction has been generated by the end predictor 403. The decode stage 404 is followed by the issue stage 405 and then the execute stage 406 (at which loop end instructions and indeed all instructions are executed). The final stage of the pipeline is the retire stage 407. In operation as shown by the box 408, for each instruction fetched the loop end predictor determines if VALID_ADDRESS is set and the fetch_address is that held as the current loop end address (instr_addr). When this is the case if VALID_COUNTER is 0 the branch of the loop end instruction is predicted is taken. Conversely if VALID_COUNTER is 1, then if loop_counter is non-zero the branch of the loop end instruction is predicted is taken and loop_counter decremented. Otherwise, the branch of the loop end instruction is predicted as not taken. Meanwhile, at the retire stage, as shown by the box 409, for a first loop end (LE) instruction the LE predictor is updated with instr_addr (of that loop end instruction) and with target_addr (i.e. the target address of the branch of the loop end instruction when taken). For any loop end instruction, if the LE_PRED flag has been set by the decode stage 404, no further action is needed at the retire stage 407. Otherwise, if the loop iteration count (as indicated by the loop end instruction) is greater than the maximum value of the loop counter, then the counter saturation bit held at the retire stage is set. In this embodiment the example is given of the loop counter being an 'm' bit counter, and hence that the maximum value it can represent is $[2^m-1]$. Otherwise, if the counter saturation bit is 0, then the loop iteration count is copied into the loop end predictor loop counter at the front-end of the pipeline. For loop end instructions not predicted by the loop end predictor updates to decrement the loop counter are sent to the loop end predictor. The handling of these updates is shown in box 410 of the figure. For a first loop end instruction (first LE=1), VALID_ADDRESS is set. If the counter saturation bit is zero, then VALID_COUNTER is set. If VALID_COUNTER is set and no prediction was made for the loop end instruction (LE_PRED=0) then the value loop_counter is decremented.

In brief overall summary in a data processing apparatus loop end prediction is carried out to predict whether a branch represented by a loop end instruction will be taken, branching to the start of the loop for a further iteration to be carried out, or will be not taken leading to the further instructions following the loop. A loop iteration counter at the fetch stage of the apparatus maintains a count on the basis of which the prediction is made. The loop iteration counter is decremented both by loop end instructions reaching the end of the pipeline for which no prediction was made and by later loop end instructions for which a prediction is made, once it has been established that a loop is being executed. This dual counting mechanism allows "shadow" loop end instructions, which were already in the pipeline by the time it was established that a loop is being executed, to be accounted for.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
   processing circuitry to execute instructions defining data processing operations; and
   fetch circuitry to retrieve a sequence of instructions for execution by the processing circuitry,
   wherein the sequence of instructions comprises a loop start instruction and a loop end instruction delimiting a loop body portion of the sequence of instructions,
   wherein the fetch circuitry comprises a loop counter arranged to indicate a remaining number of iterations for which the loop body portion is to be executed and a loop validity indicator, wherein the processing circuitry is responsive to execution of a first instance of the loop end instruction to set the loop validity indicator,
   wherein the fetch circuitry comprises loop end prediction circuitry responsive to the loop end instruction in the sequence of instructions, when the loop validity indicator is set, to generate in dependence on the loop counter an associated branch prediction for the loop end instruction of either:
      a taken branch prediction, leading to a first instruction of the loop body portion; or
      a not-taken branch prediction, leading to a next instruction sequentially following the loop end instruction in the sequence of instructions,
   wherein the loop end prediction circuitry is responsive to the loop counter indicating a non-zero remaining number of iterations to generate the taken branch prediction and to decrement the loop counter,
   wherein the loop end prediction circuitry is responsive to the loop counter indicating zero remaining iterations to generate the not-taken branch prediction, and
   wherein the processing circuitry is responsive to execution of the loop end instruction, when the loop end instruction does not have the associated prediction, to signal to the loop end prediction circuitry to decrement the loop counter.

2. The apparatus as claimed in claim 1, wherein the fetch circuitry further comprises a saturated counter indicator, wherein the processing circuitry is responsive to the loop end instruction, when a remaining loop iteration count is greater than a defined maximum count value to set the saturated counter indicator, wherein the loop end prediction circuitry is responsive to the saturated counter indicator being set to generate the taken branch prediction without decrementing the loop counter.

3. The apparatus as claimed in claim 2, wherein the defined maximum count value is a maximum value that the loop counter can indicate.

4. The apparatus as claimed in claim 2, wherein the defined maximum count value is a maximum number of loop end instructions that can be contemporaneously in-flight in the apparatus.

5. The apparatus as claimed in claim 2, wherein the processing circuitry is responsive to the loop end instruction, when the remaining loop iteration count is not greater than the defined maximum count value to unset the saturated counter indicator.

6. The apparatus as claimed in claim 2, wherein the processing circuitry is responsive to the loop end instruction, when the remaining loop iteration count is not greater than the defined maximum count value to copy the remaining loop iteration count into the loop counter in the fetch circuitry.

7. The apparatus as claimed in claim 1, further comprising decode circuitry following the fetch circuitry and preceding the processing circuitry, wherein the decode circuitry is responsive to the loop end instruction, when the loop end prediction circuitry has generated the associated branch prediction for the loop end instruction, to set a loop end prediction flag associated with the loop end instruction.

8. The apparatus as claimed in claim 7, wherein the processing circuitry is responsive to the loop end instruction, when the loop end prediction flag is not set, to signal to the loop end prediction circuitry to decrement the loop counter.

9. The apparatus as claimed in claim 1, further comprising branch prediction circuitry to generate branch predictions for instructions in the sequence of instructions, wherein the processing circuitry is arranged to use a branch prediction for the loop end instruction generated by the branch prediction circuitry, when the loop end instruction does not have the associated prediction.

10. The apparatus as claimed in claim 1, further comprising branch resolution circuitry responsive to a branch misprediction to cause a reset of the loop counter and the loop end prediction circuitry.

11. A method of data processing comprising:
fetching using fetch circuitry a sequence of instructions for execution by processing circuitry, wherein the sequence of instructions comprises a loop start instruction and a loop end instruction delimiting a loop body portion of the sequence of instructions;
maintaining in the fetch circuitry a loop counter arranged to indicate a remaining number of iterations for which the loop body portion is to be executed and a loop validity indicator;
setting by the processing circuitry the loop validity indicator in response to execution of a first instance of the loop end instruction;
generating in the fetch circuitry in dependence on the loop counter an associated branch prediction for the loop end instruction when the loop validity indicator is set, wherein the associated branch prediction is either:
a taken branch prediction, leading to a first instruction of the loop body portion; or
a not-taken branch prediction, leading to a next instruction sequentially following the loop end instruction in the sequence of instructions;
in response to the loop counter indicating a non-zero remaining number of iterations, loop end prediction circuitry generating the taken branch prediction and decrementing the loop counter;
in response to the loop counter indicating zero remaining iterations, the loop end prediction circuitry generating the not-taken branch prediction; and
in response to execution of the loop end instruction by the processing circuitry when the loop end instruction does not have the associated prediction, the loop end prediction circuitry decrementing the loop counter.

12. The method as claimed in claim 11, further comprising maintaining a saturated counter indicator, wherein in response to execution of the loop end instruction, when a remaining loop iteration count is greater than a defined maximum count value, the saturated counter indicator is set, and when the saturated counter indicator is set the taken branch prediction is generated without decrementing the loop counter.

13. The method as claimed in claim 12, wherein the defined maximum count value is a maximum value that the loop counter can indicate.

14. The method as claimed in claim 12, wherein the defined maximum count value is a maximum number of loop end instructions that can be contemporaneously in-flight in the apparatus.

15. The method as claimed in claim 12, wherein in response to execution of the loop end instruction, when the remaining loop iteration count is not greater than the defined maximum count value, the saturated counter indicator is unset.

16. The method as claimed in claim 12, wherein in response to the loop end instruction, when the remaining loop iteration count is not greater than the defined maximum count value, the remaining loop iteration count is copied into the loop counter.

17. The method as claimed in claim 11, further comprising decoding the sequence of instructions following the fetching, wherein the decoding for the loop end instruction comprises, when the associated branch prediction for the loop end instruction has been generated, to set a loop end prediction flag associated with the loop end instruction.

18. The method as claimed in claim 17, wherein in response to execution of the loop end instruction, when the loop end prediction flag is not set, a signal to decrement the loop counter is generated.

19. The method as claimed in claim 11, further comprising a branch prediction process for instructions in the sequence of instructions, wherein a branch prediction for the loop end instruction generated by the branch prediction process is used, when the loop end instruction does not have the associated prediction.

* * * * *